(12) United States Patent
Nozaki et al.

(10) Patent No.: US 9,934,655 B2
(45) Date of Patent: Apr. 3, 2018

(54) ELECTRONIC APPARATUS AND ELECTRONIC REGISTER

(71) Applicant: CASIO COMPUTER CO., LTD., Shibuya-ku, Tokyo (JP)

(72) Inventors: Takahiro Nozaki, Akiruno (JP); Satoshi Ogasawara, Akishima (JP); Yoshihiko Iwata, Toshima (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 15/278,579

(22) Filed: Sep. 28, 2016

(65) Prior Publication Data

US 2017/0186284 A1 Jun. 29, 2017

(30) Foreign Application Priority Data

Dec. 25, 2015 (JP) .................................. 2015-253175

(51) Int. Cl.
*G07G 1/00* (2006.01)
*G07G 1/12* (2006.01)
*G06F 1/16* (2006.01)

(52) U.S. Cl.
CPC ............. *G07G 1/0027* (2013.01); *G06F 1/16* (2013.01); *G07G 1/0018* (2013.01); *G07G 1/12* (2013.01)

(58) Field of Classification Search
CPC ............. G07G 1/00; G07G 5/00; G06F 17/00
USPC ........................................ 235/22, 10, 7 R, 375
See application file for complete search history.

(56) References Cited

U.S. PATENT DOCUMENTS 6,507,352 B1 * 1/2003 Cohen .................... G06F 1/181
705/16

FOREIGN PATENT DOCUMENTS

JP 2013010185 A 1/2013

* cited by examiner

*Primary Examiner* — Edwyn Labaze
(74) *Attorney, Agent, or Firm* — Holtz, Holtz & Volek PC

(57) ABSTRACT

An electronic apparatus of the present invention includes an apparatus body which is provided with an operation section, and a tray member which is slidably provided on the apparatus body and projects from a rear surface of the apparatus body on a side opposite to an operation side of the operation section so that a written announcement can be posted.

12 Claims, 8 Drawing Sheets

ELECTRONIC APPARATUS AND
ELECTRONIC REGISTER

CROSS-REFERENCE TO RELATED
APPLICATION

This application is based upon and claims the benefit of priority from the prior Japanese Patent Application No. 2015-253175, filed Dec. 25, 2015, the entire contents of which are incorporated herein by reference.

BACKGROUND OF THE INVENTION

1. Field of the Invention

The present invention relates to an electronic apparatus and an electronic register.

2. Description of the Related Art

An electronic register is known that has a structure where an input display device is mounted on its apparatus body in a manner to be rotatable in a vertical direction and an auxiliary display device is provided on the rear surface of the apparatus body in a manner to be movable in the vertical direction and rotatable in the horizontal direction, as disclosed in Japanese Patent Application Laid-Open (Kokai) Publication No. 2013-010185.

In this electronic register, sales data is inputted by an operator performing an input operation on the input display device, and the inputted data is displayed on the input display device so that the operator can see the displayed data, and also displayed on the auxiliary display device so that a customer can see the displayed data.

However, this electronic register has a problem in that although inputted data is displayed on the auxiliary display device so that a customer can see the displayed data, a written announcement including information such as an advertisement or a notice cannot be easily posted on the rear surface of the apparatus body and delivered to customers.

SUMMARY OF THE INVENTION

An object of the present invention is to easily inform a customer of information such as an advertisement or a notice by simply posting an announcement.

In accordance with one aspect of the present invention, there is provided an electronic apparatus comprising: an apparatus body which is provided with an operation section; and a tray member which is slidably provided on the apparatus body and projects from a rear surface of the apparatus body on a side opposite to an operation side of the operation section so that a written announcement can be posted.

In accordance with another aspect of the present invention, there is provided an electronic register comprising an apparatus body provided with an operation section which is operated by an operator to input information regarding a commodity whose sales are registered; a display which is provided in an area different from an area where the operation section is provided, and displays the information regarding the commodity to a customer; and a tray member which is slidably provided on the apparatus body and projects from a rear surface of the apparatus body on a side opposite to an operation side of the operation section so that a written announcement can be posted.

According to the present invention, an announcement can be easily posted. Therefore, a customer can be easily informed of information such as an advertisement or a notice.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

BRIEF DESCRIPTION OF THE DRAWINGS

FIG. 7A and FIG. 7B are diagrams showing the tray member of FIG. 6, of which FIG. 7A is a perspective view of the lower surface and FIG. 7B is a perspective view of the upper surface;

DETAILED DESCRIPTION OF THE
PREFERRED EMBODIMENT

An embodiment in which the present invention has been applied in an electronic register will hereinafter be described with reference to FIG. 1 to FIG. 8.

Figure 1:
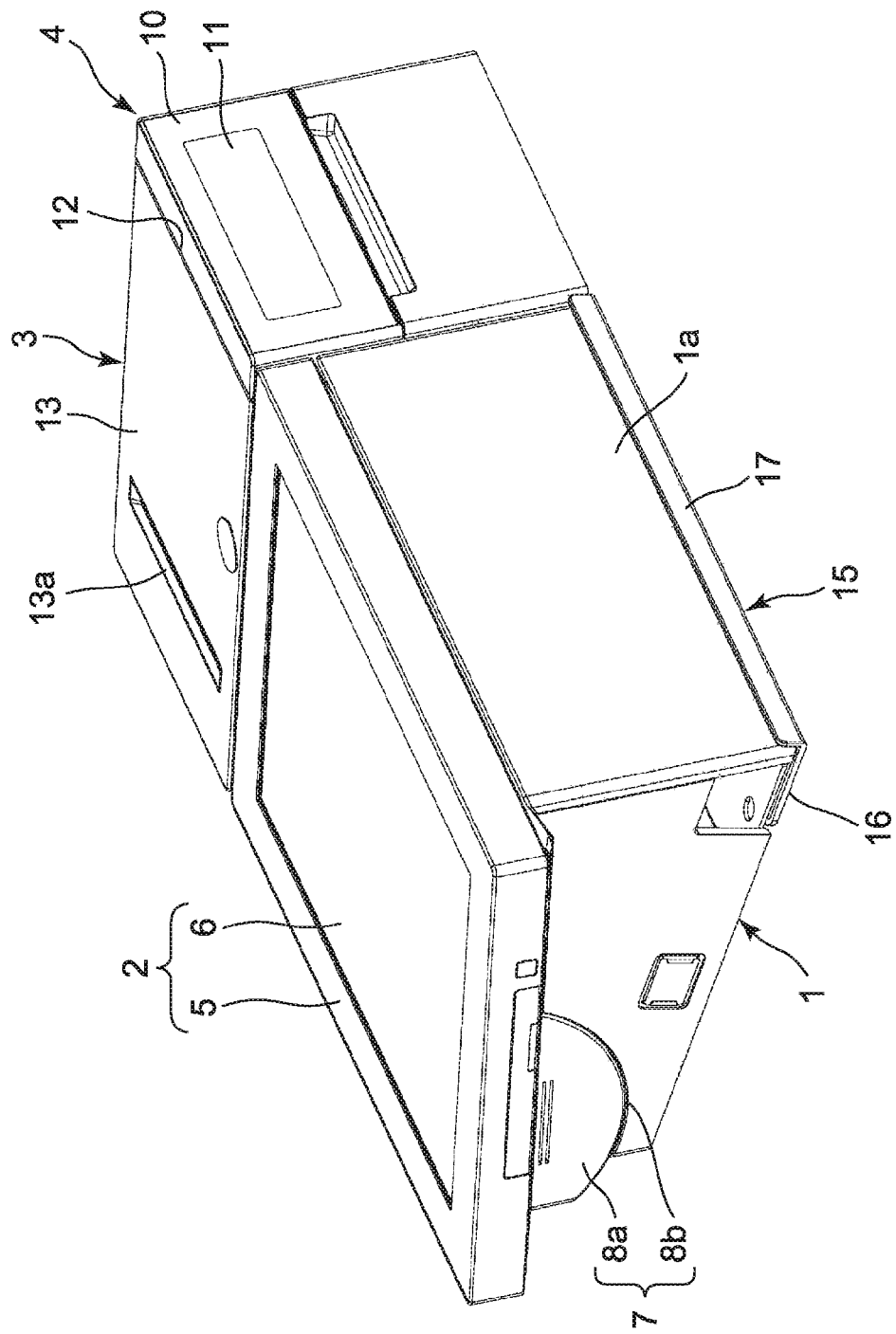
FIG. 1 is a perspective view showing an embodiment in which the present invention has been applied in an electronic register.

This electronic register includes an apparatus case 1, as shown in FIG. 1. The apparatus case 1 is loaded with an input display unit 2, a printer unit 3, and an auxiliary display device 4.

The input display unit 2 includes a unit case 5 and an input display panel 6 provided thereon as shown in FIG. 1, and is structured such that an operator inputs information regarding a commodity which has been purchased by a customer and whose sales are registered by a touch operation on the input display panel 6.

In this embodiment, the input display panel 6 has a transparent touch panel arranged on its upper surface, which is not shown.

The input display panel 6 is structured such that the operator inputs information regarding a commodity purchased by a customer by performing a touch operation on the touch panel of the input display panel 6 while seeing information displayed on the input display panel 6, and the inputted information is displayed on the input display panel 6 in FIG. 1.

The printer unit 3 prints, on recording paper, sales information based on commodity information regarding inputted by the input display panel 6.

The unit case 5 is arranged on the apparatus case 1 with it being inclined forward and downward except for its one portion (a portion on the right side in FIG. 1).

Figure 2:
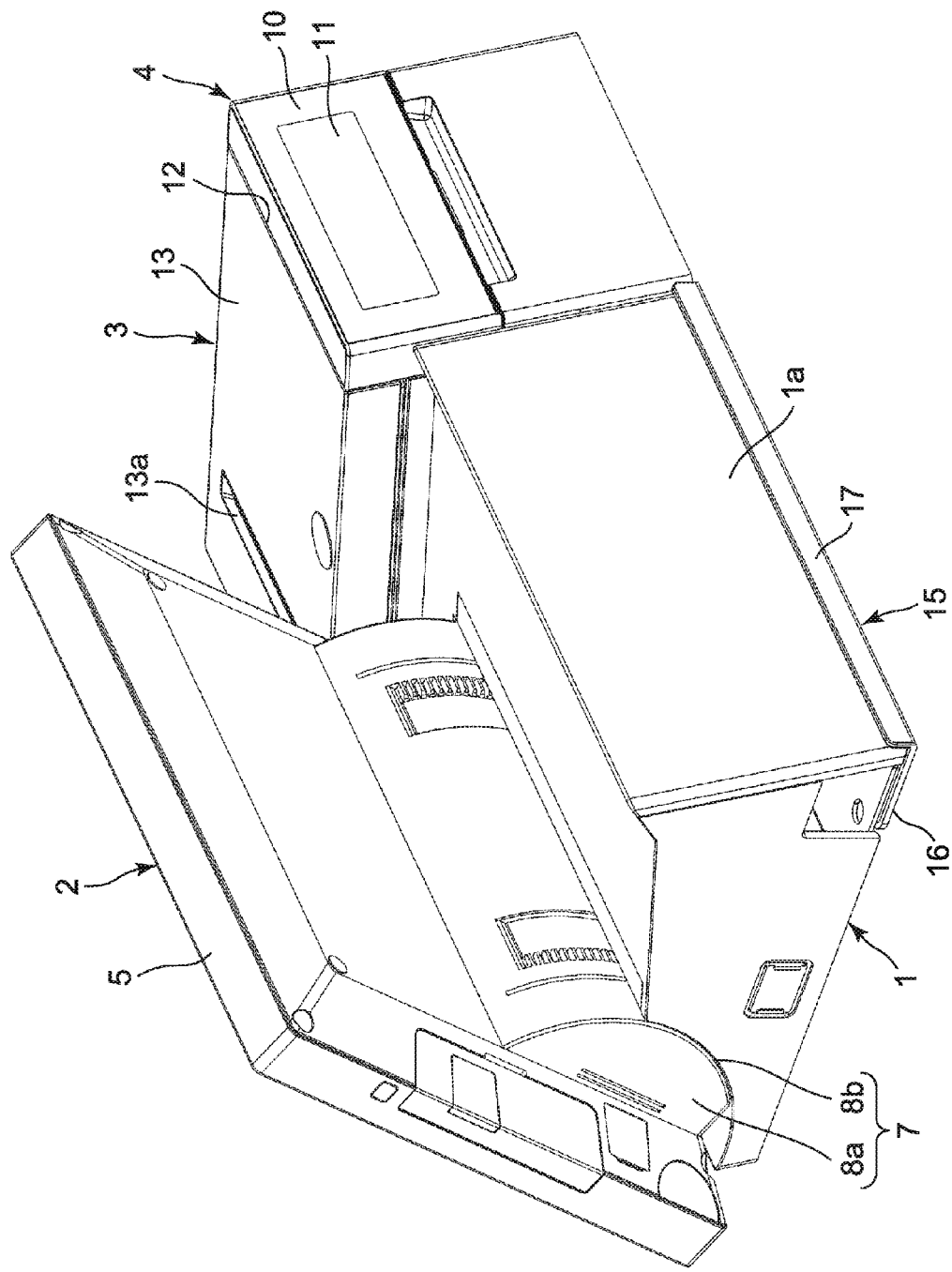
FIG. 2 is a perspective view showing a state where the unit case of an input display unit in the electronic register of FIG. 1 has been rotated upward at its rear end.
Figure 3:
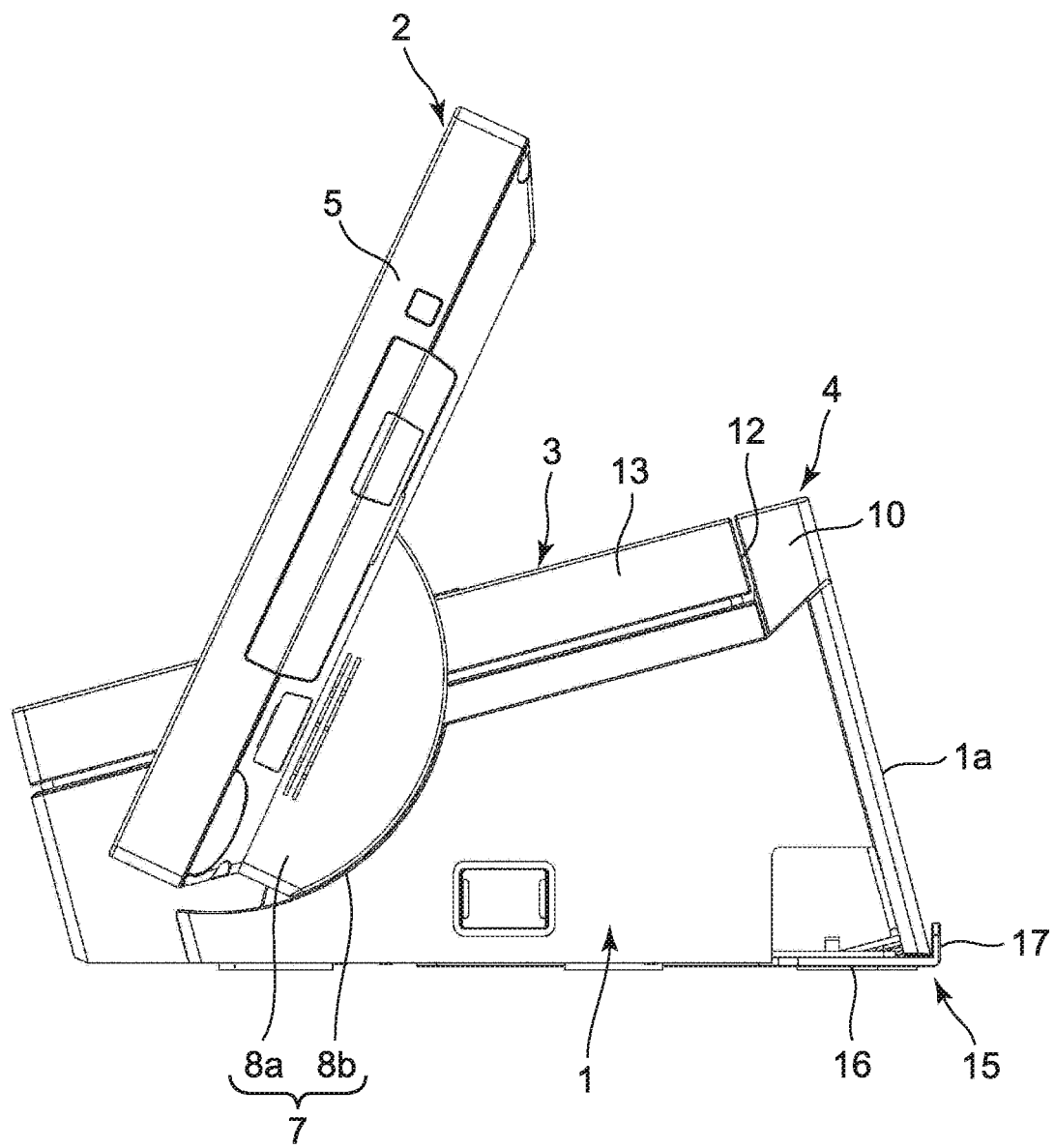
FIG. 3 is a side view of the electronic register shown in FIG. 2.

In this embodiment, the unit case 5 is rotatably provided on the apparatus case 1 by a hinge mechanism 7, as shown in FIG. 1 to FIG. 3.

This hinge mechanism 7 includes a rotation section 8a which is provided projecting in a semicircular shape on the lower surface of the unit case 5, and a support section 8b which is concavely provided having a semicircular shape on the apparatus case 1 and on which the rotation section 8a on the unit case 5 is rotatably arranged.

As a result, the unit case 5 is structured such that its rear portion (right portion in FIG. 2) is inclined upward as shown in FIG. 2 when the semicircular rotation section 8a in the hinge mechanism 7 provided on the lower surface thereof is rotated to move within the semicircular support section 8b in the hinge mechanism 7 provided on the top of the apparatus case 1, as shown in FIG. 1 to FIG. 3.

The auxiliary display device 4 is a display for displaying information regarding a commodity whose sales are registered, which has been inputted by the input display unit 2, to the customer. This auxiliary display device 4 is constituted by a display section 11 for displaying information being provided in a display case 10, and the display case 10 is retractably arranged within a display storage section 12 provided on the rear surface of the apparatus case 1, as shown in FIG. 1 to FIG. 3.

More specifically, the auxiliary display device 4 is structured such that, when the display case 10 is pulled upward from the display storage section 12 in the apparatus case 1 so that it is arranged above the apparatus case 1, and rotated in a substantially horizontal direction in this state, information displayed on the display section 11 is oriented so that a customer can easily see the information.

On the other hand, the printer unit 3 is a printer device, and includes a printer cover 13 which openably covers a recording paper storage section (not shown) provided inside the apparatus case 1, as shown in FIG. 1 to FIG. 3.

The printer cover 13 is arranged on the apparatus case 1 at substantially the same height as that of the upper surface of the input display unit 2 with it being inclined forward and downward. In this state, the printer cover 13 opens and closes toward the right side thereof, i.e., the side opposite to the input display unit 2 on the apparatus case 1.

In this embodiment, the printer unit 3 includes a printer which prints printing information on recording paper wound in a roll shape and stored in the recording paper storage section, which is not shown.

This printer is structured to print printing information on recording paper and eject the printed recording paper out of the apparatus case 1 via a recording paper ejection port 13a in the printer cover 13.

On the bottom of the apparatus case 1, a tray member 15 so that a written announcement 14 can be posted is provided projecting retractably from the rear surface 1a of the apparatus case 1 positioned on the side opposite to the operation side of the input display panel 6, as shown in FIGS. 1 to 5.

More specifically, this tray member 15 includes a loading section 16 arranged under the lower surface of the apparatus case 1, and a pressing section 17 which separably corresponds to the rear surface 1a of the apparatus case 1 and presses and holds a lower portion of the written announcement 14 against the rear surface 1a of the apparatus case 1.

Figure 4:
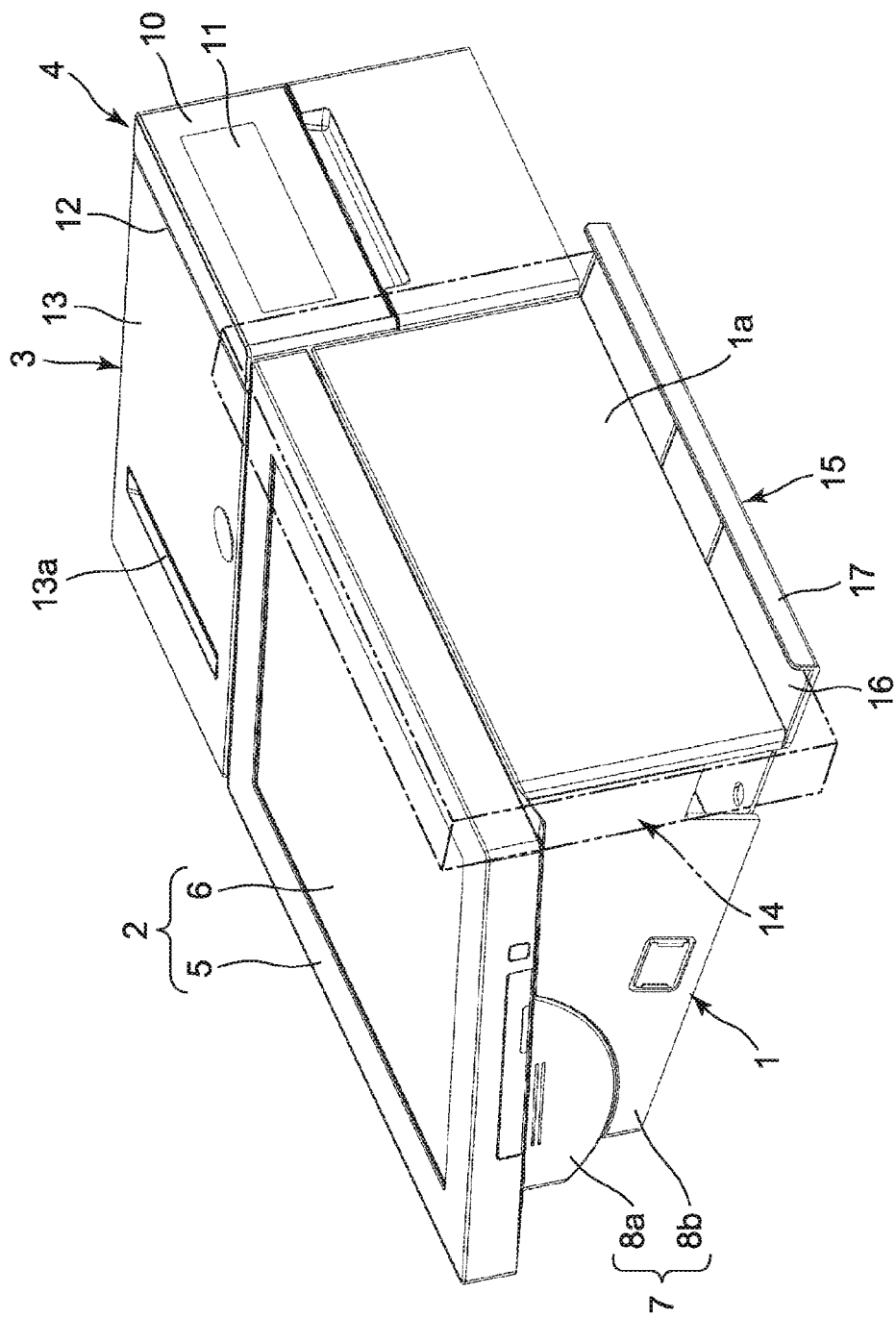
FIG. 4 is a side view showing a state where a tray member has been pulled outward from the rear surface of the apparatus case of the electronic register shown in FIG. 1.
Figure 5:
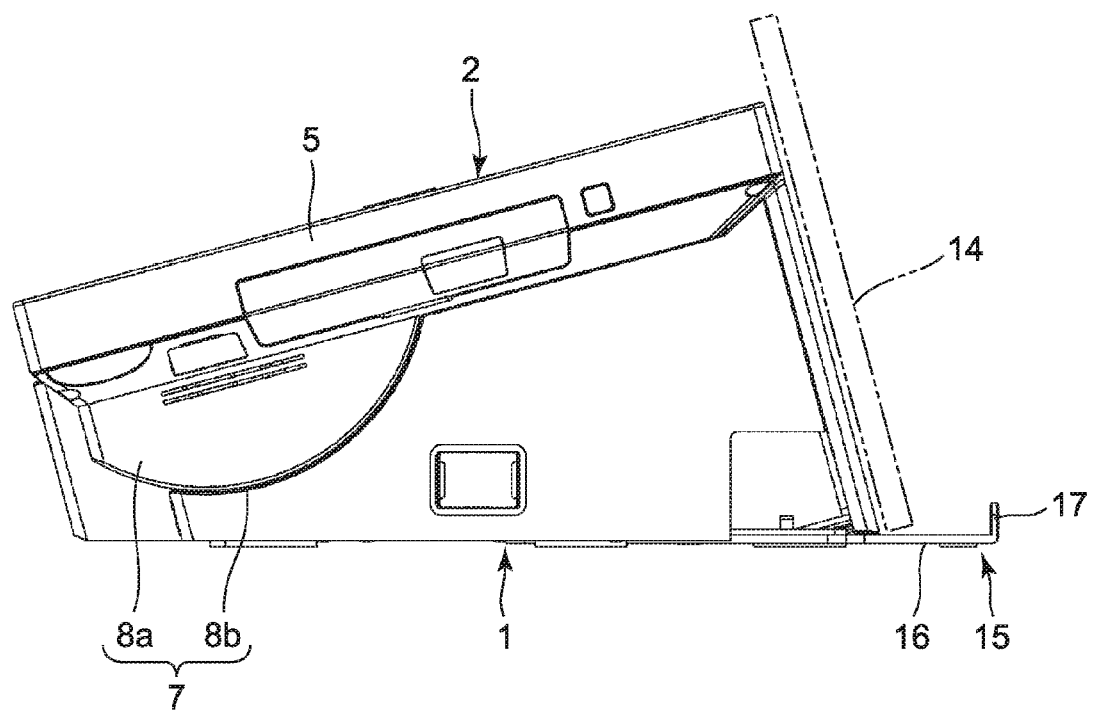
FIG. 5 is a side view of the electronic register shown in FIG. 4.

In this embodiment, examples of the written announcement 14 arranged on the rear surface 1a of the apparatus case 1 include paper having information such as an advertisement or a notice printed thereon, a panel having the information printed thereon, or a tablet terminal and a display device including a display section which electrooptically displays the information, as indicated by a two-dot and dash line in FIG. 4 and FIG. 5.

The written announcement 14 is pressed against the rear surface 1a of the apparatus case 1 by the pressing section 17 with it being arranged on the loading section 16 of the tray member 15 pulled out of the rear surface 1a of the apparatus case 1.

Figure 6:
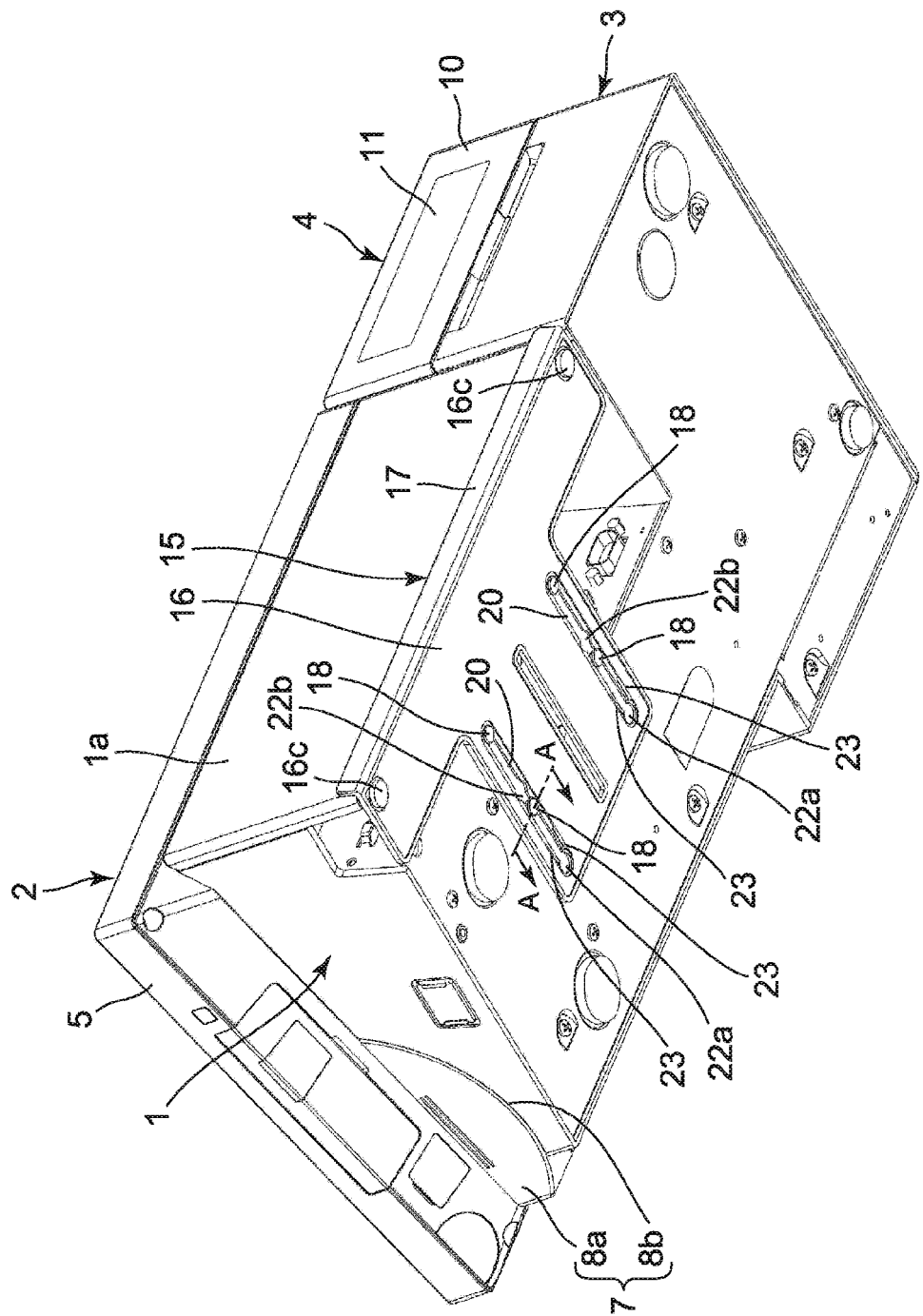
FIG. 6 is a perspective view of the electronic register shown in FIG. 1 when viewed from below.
Figure 7A:
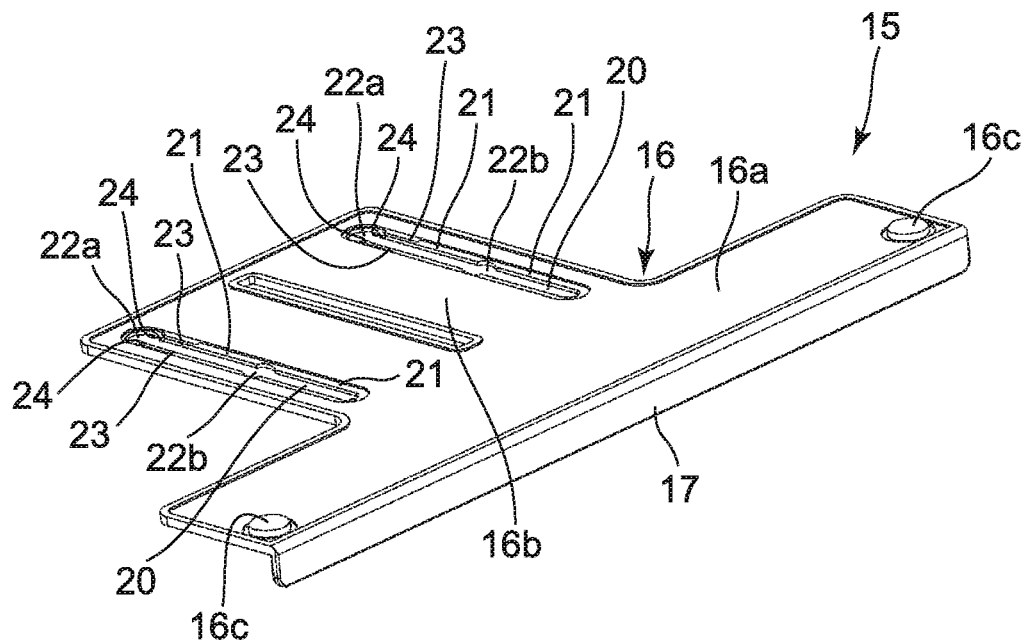
Figure 7B:
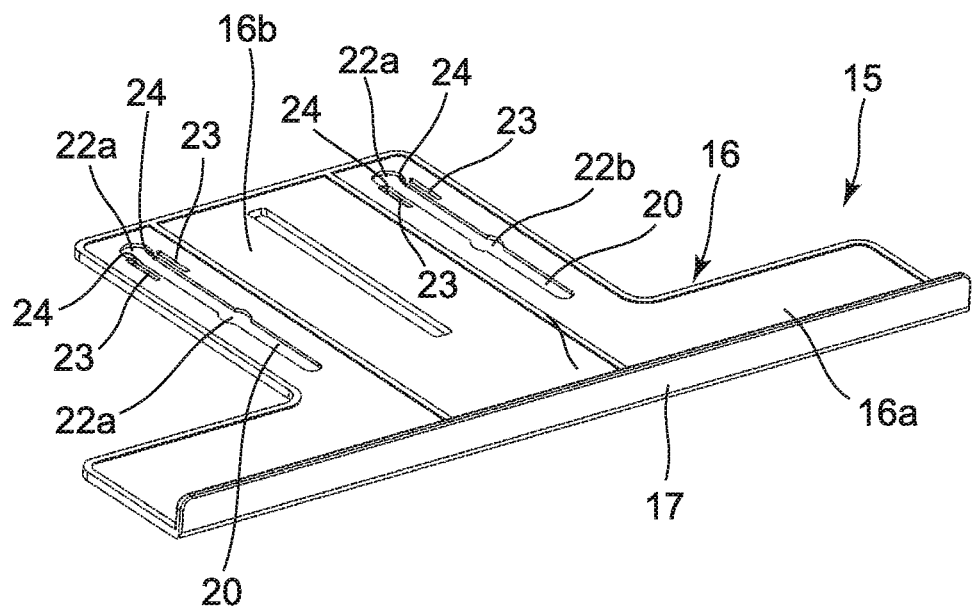

The loading section 16 includes an outer plate section 16a positioned on the rear surface 1a side of the apparatus case 1 and an inner plate section 16b projecting toward the front side of the apparatus case 1 from an inner end portion of the outer plate section 16a, as shown in FIG. 6, FIG. 7A and FIG. 7B.

The outer plate section 16a is formed such that its length in the horizontal direction of the apparatus case 1 is substantially the same as the length of the apparatus case 1 excluding the printer unit 3 in the horizontal direction, as shown in FIG. 4 and FIG. 5.

Also, the outer plate section 16a is formed such that its length in the longitudinal direction of the apparatus case 1 is slightly larger than the thickness of the display case 10 in the auxiliary display device 4, that is, the length of the display case 10 in the longitudinal direction of the apparatus case 1, as shown in FIG. 4 and FIG. 5.

As a result, the outer plate section 16a is formed having a rectangular plate shape whose length in the horizontal direction of the apparatus case 1 is larger than its length in the longitudinal direction of the apparatus case 1. In areas on both sides on the lower surface of the outer plate section 16a, rubber feet 16c are respectively provided.

The inner plate section 16b is provided at an intermediate portion at an inner end portion of the outer plate section 16a, as shown in FIG. 6 and FIG. 7A and FIG. 7B.

The inner plate section 16b is formed such that its length in the horizontal direction of the apparatus case 1 is substantially half of the length of the outer plate section 16a in the horizontal direction of the apparatus case 1.

Also, the inner plate section 16b is formed such that its length in the longitudinal direction of the apparatus case 1 is substantially half of the length of the bottom portion of the apparatus case 1 in the longitudinal direction.

As a result, the inner plate section 16b is formed having a substantially square plate shape.

On the other hand, the pressing section 17 is provided upright at an outer end portion of the loading section 16 on the rear surface 1a side of the apparatus case 1, i.e., at an outer end of the outer plate section 16a in the loading section 16, as shown in FIG. 6, FIG. 7A and FIG. 7B.

This pressing section 17 is formed having a plate shape such that its length in the horizontal direction of the apparatus case 1 is the same as the length of the outer plate section 16a in the loading section 16.

Also, the pressing section 17 is formed such that its length in the vertical direction is smaller than the thickness of the unit case 5 in the input display unit 2.

Also, the tray member 15 is structured such that the loading section 16 is mounted in a manner to be slidable in the longitudinal direction of the apparatus case 1 by a plurality of guide members 18 provided on the lower surface of the apparatus case 1, as shown in FIG. 6, FIG. 7A and FIG. 7B.

In this embodiment, the inner plate section 16b of the loading section 16 is provided with a plurality of guide holes 20 which are arranged in two rows parallel to each other along the longitudinal direction of the apparatus case 1 and slidably guided by the plurality of guide members 18.

Each of the plurality of guide holes 20 has a guide concave section 21 provided at a hole edge on its lower surface along a sliding direction of the tray member 15, as shown in FIG. 6 and FIG. 7A.

In each of the guide holes 20 arranged in two rows, two guide members 18 among the plurality of guide members 18 are provided.

More specifically, a distance between these two guide members 18 of the plurality of guide members 18 corresponding to one guide hole 20 is set to be substantially half of the length of the guide hole 20 in the longitudinal direction.

As a result, each guide hole 20 is formed such that its length in the longitudinal direction is longer than the distance between two guide members 18 corresponding to one guide hole 20 by a length in the longitudinal direction of the outer plate section 16a of the loading section 16, that is, a length in which the tray member 15 is slid, as shown in FIG. 6.

Figure 8A:
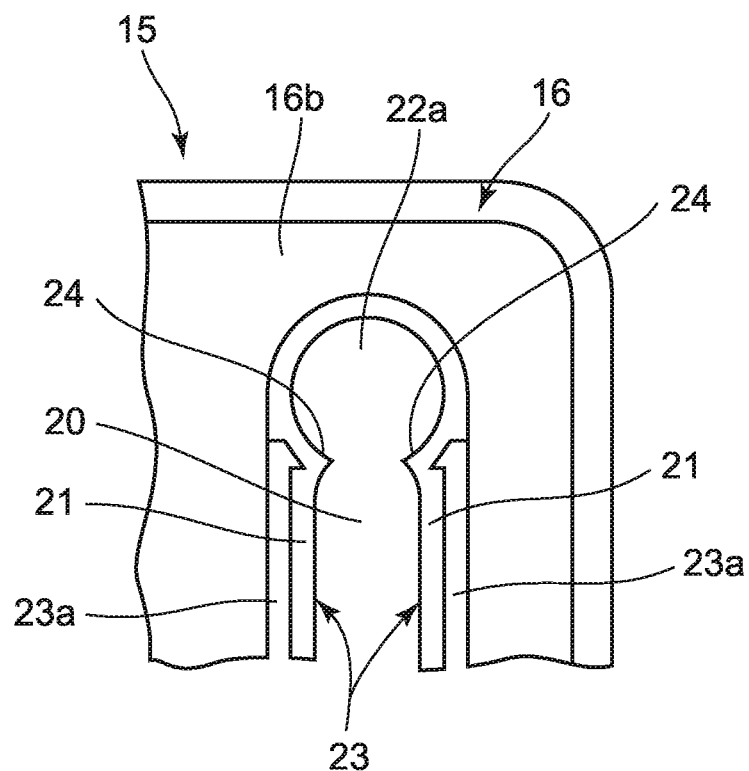
FIG. 8A is an enlarged view showing the main portion of FIG. 7A.
Figure 8B:
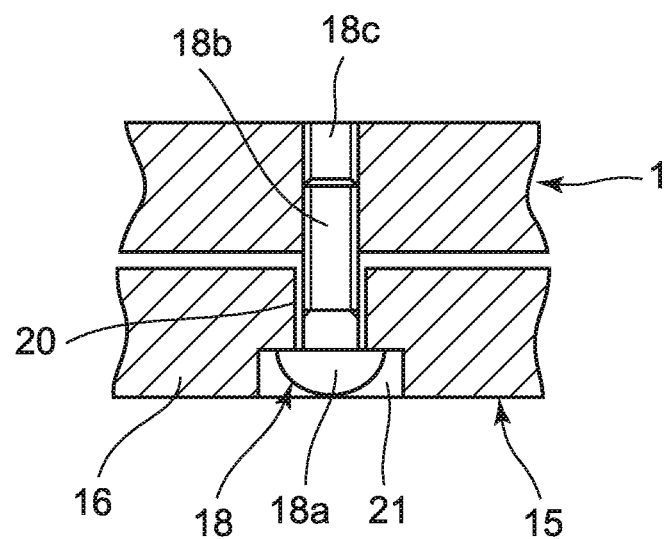
FIG. 8B is an enlarged sectional view showing the main portion of the tray member taken along line A-A in FIG. 6.

Also, each of the plurality of guide members 20 includes a head section 18a arranged in a manner to be slidable within the guide concave section 21 positioned at an edge of the guide hole 20 and a threaded shaft 18b fixed to the lower surface of the apparatus case 1 via the guide hole 20, as shown in FIG. 8B.

More specifically, the head section 18a of the guide member 18 is formed such that its length (height) in the axial direction (vertical direction) is substantially the same as the depth of the guide concave section 21, and thereby structured not to protrude below the tray member 15 from the guide concave section 21, as shown in FIG. 8B.

Also, this head section 18a is formed such that its outer diameter is larger than the length of the guide hole 20 in the direction (width direction) perpendicular to the longitudinal direction and smaller than the length of the guide concave section 21 in the width direction.

The threaded shaft 18b of the guide member 18 is screwed into a threaded hole 18c provided on the lower surface of the apparatus case 1, and thereby mounted on the lower surface of the apparatus case 1, as shown in FIG. 8B.

This threaded shaft 18b is formed such that its length in the axial direction (vertical direction) by which it protrudes from the lower surface of the apparatus case 1 is the same as or longer than the depth of the guide hole 20.

Also, this threaded shaft 18b is formed such that its outer diameter is substantially the same as the length of the guide hole 20 in the direction (width direction) perpendicular to the longitudinal direction.

As a result, each of the plurality of guide members 18 is structured such that the threaded shaft 18b is screwed into and fixed to the threaded hole 18c on the lower surface of the apparatus case 1 via the guide hole 20 provided in the loading section 16 of the tray member 15 and the head section 18a is arranged within the guide concave section 21 positioned at the edge of the guide hole 20 in this state, as shown in FIG. 6 to FIG. 8.

Accordingly, each of the plurality of guide members 18 is structured such that the threaded shaft 18b guides the guide hole 20 and the head section 18a guides the guide concave section 21 while pressing the guide concave section 21 against the apparatus case 1, whereby the tray member is guided in the longitudinal direction of the apparatus case 1, as shown in FIG. 6 to FIG. 8.

In this embodiment, the plurality of guide holes 20 respectively include a plurality of attachment/detachment holes 22a and 22b which are provided vertically penetrating therethrough and through which the head sections 18a in the guide members 18 are removably inserted, as shown in FIG. 6, FIG. 7A and FIG. 7B. Each of the plurality of attachment/detachment holes 22a and 22b is formed such that its inner diameter is the same as or slightly larger than the outer diameter of the head section 18a in the guide member 18.

Two of the plurality of attachment/detachment holes 22a and 22b are respectively provided at front ends (left ends in FIG. 7A) of the corresponding guide holes 20 on the front side of the apparatus case 1, as shown in FIG. 6 and FIG. 7A and FIG. 7B.

The other two attachment/detachment holes 22b are respectively provided in substantially intermediate portions of the corresponding guide holes 20 in the longitudinal direction.

In this embodiment, a distance between each attachment/detachment hole 22a positioned at the front end of each of the guide holes 20 and each attachment/detachment hole 22b positioned in the intermediate portion of the guide hole 20 is set to be the same as each interval between the guide members 18 in the longitudinal direction. Also, a distance to each attachment/detachment hole 22b in the intermediate portion of each guide hole 20 from an outer end of each guide hole 20 on the rear surface 1a side of the apparatus case 1 is set shorter than each interval between the guide members 18 in the longitudinal direction.

As a result, the plurality of guide members 18 are structured such that, when the tray member 15 is most pulled out of the rear surface 1a of the apparatus case 1, the head sections 18a of the plurality of guide members 18 are respectively arranged within the attachment/detachment holes 22a and 22b of the plurality of guide holes 20, and the tray member 15 is removed by the head sections 18a being separated from the plurality of guide holes 20 via the attachment/detachment holes 22a and 22b in this state, as shown in FIG. 6, FIG. 7A and FIG. 7B.

Also, the plurality of guide members 18 are structured such that, when the pressing section 17 of the tray member 15 is pressed toward the rear surface 1a of the apparatus case 1 with the head sections 18a being arranged within the plurality of attachment/detachment holes 22a and 22b of the plurality of guide holes 20, the head sections 18a of the plurality of guide members 18 are respectively detached from the attachment/detachment holes 22a and 22b of the plurality of guide holes 20 and arranged within the guide concave sections 21 in the plurality of guide holes 20, whereby the tray member 15 does not drop off the lower surface of the apparatus case 1, as shown in FIG. 6, FIG. 7A and FIG. 7B.

Also, the plurality of guide holes 20 are respectively provided with a plurality of elastic holding sections 23 which elastically hold the threaded shafts 18b of the plurality of guide members 18 such that they are slidable, as shown in FIG. 6 to FIG. 8.

More specifically, each of the plurality of elastic holding sections 23 has slit holes 23a provided opposing each other within the guide concave section 21 positioned on both sides thereof in the direction perpendicular to the longitudinal direction of the plurality of guide holes 20.

As a result, each of the plurality of elastic holding sections 23 is structured such that opposing edges of the guide hole 20 positioned between the slit holes 23a are elastically deformed toward the slit holes 23a, respectively.

In this embodiment, each of the plurality of elastic holding sections 23 is provided such that it is oriented toward the pressing section 17 of the tray member 15 from both sides of each attachment/detachment hole 22a positioned at the front end (the left end in FIG. 1A) in the longitudinal direction of the corresponding guide hole 20, as shown in FIG. 6 to FIG. 8A.

In addition, each of the plurality of elastic holding sections 23 is formed such that its length in the longitudinal direction is shorter than the sliding length of the tray member 15. As a result, the plurality of elastic holding sections 23 is structured such that, when the threaded shafts 18b of the plurality of guide members 18 are respectively relatively slid within the plurality of guide holes 20, each threaded shaft 18b of the plurality of guide members 18 is elastically held from both sides.

Also, two attachment/detachment holes 22a of the plurality of guide holes 20 at the front ends (upper ends in FIG. 8A) of the guide holes 20 on the front side of the apparatus case 1 are respectively provided with click sections 24 which give a click feeling to the tray member 15 when the plurality of guide members 18 reach the attachment/detachment holes 22a and 22b, as shown in FIG. 6 to FIG. 8A.

More specifically, the plurality of click sections 24 are elastic projections provided in areas where the guide holes 20 and the attachment/detachment holes 22a cross each other and project in directions in which they come close to each other, as shown in FIG. 7A and FIG. 7B.

These click sections 24 are structured to elastically deform when the threaded shafts 18b of the guide members 18 reach the attachment/detachment holes 22a and to elastically return when the threaded shafts 18b of the guide members 18 are fitted into the attachment/detachment holes 22a so as to give a click feeling to the tray member 15.

Next the mechanism of the electronic register is described.

First, the tray member 15 is mounted on the bottom of the apparatus case 1.

Here, the plurality of attachment/detachment holes 22a and 22b provided in the loading section 16 of the tray member 15 are positioned such that they correspond to the plurality of guide members 18 provided on the lower surface of the apparatus case 1, as shown in FIG. 6.

In this state, the plurality of guide members 18 are respectively relatively inserted into the plurality of attachment/detachment holes 22 in the loading section 16.

Consequently, the head sections 18a and the threaded shafts 18b of the plurality of guide members 18 are respectively arranged within the plurality of attachment/detachment holes 22 in the loading section 16. In this state, the pressing section 17 of the tray member 15 is pressed toward the rear surface 1a of the apparatus case 1.

As a result, the head sections 18a of the plurality of guide members 18 are relatively slid and arranged within the guide concave sections 21 in the plurality of guide holes 20 in the loading section 16, and the threaded shafts 18b of the plurality of guide members 18 are relatively slid and arranged within the plurality of guide holes 20.

In this state, the head sections 18a of the plurality of guide members 18 have been detached from the attachment/detachment holes 22a and 22b of the plurality of guide holes 20 and arranged within the guide concave sections 21 of the plurality of guide holes 20, so that the tray member 15 has been slidably held on the lower surface of the apparatus case 1 without dropping off the lower surface of the apparatus case 1.

Next, the use of this electronic register is described.

First, the inclination of the unit case 5 in the input display unit 2 to the apparatus case 1 is adjusted and the height and the orientation of the auxiliary display device 4 are adjusted.

More specifically, in the adjustment of the inclination of the unit case 5, the semicircular-shaped rotation section 8a of the hinge mechanism 7 provided on the lower surface of the unit case 5 is rotated to move within the semicircular-shaped support section 8b of the hinge mechanism 7 provided on the upper surface of the apparatus case 1 so as to adjust the rise of a rear portion (a right portion in FIG. 2) of the apparatus case 1 and incline the unit case 5 at an angle at which the operator can easily perform a touch operation on the input display panel 6 of the input display unit 2.

Also, in the adjustment of the height and the direction of the auxiliary display device 4, the display case 10 of the auxiliary display device 4 is pulled upward from the display storage section 12 in the apparatus case 1 so that it is arranged above the apparatus case 1, and the display case 10 is rotated in a substantially horizontal direction in this state.

As a result, information displayed on the display section 11 is positioned at a height at which the information can be easily seen by a customer and oriented in a direction in which the information can be easily seen by the customer.

In this state, when the operator performs a touch operation on the input display panel 6 of the input display unit 2 to input information regarding a commodity purchased by the customer, the inputted information is displayed on the input display panel 6 of the input display unit 2 and on the display section 11 of the auxiliary display device 4.

As a result, the operator can see the information displayed on the input display panel 6 of the input display unit 2 while the customer can see the information displayed on the display section 11 of the auxiliary display device 4.

Then, when printing the displayed information as sales data by the printer unit 3 so as to issue a receipt, the operator performs a touch operation on the input display panel 6 of the input display unit 2 so as to drive a printer section (not shown) in the printer unit 3.

As a result, the print section sequentially prints the sales data on recording paper (not shorn), and issues the printed recording paper as a receipt from the recording paper ejection port 13a in the printer cover 13.

In the above-described situation where the operator sees information displayed on the input display panel 6 of the input display unit 2 and the customer sees the information displayed on the display section 11 of the auxiliary display device 4, a written announcement 14 having information such as an advertisement or a notice can be shown to the customer by being arranged on the rear surface 1a of the apparatus case 1.

In this case, the pressing section 17 of the tray member 15 is pulled out of a lower portion of the rear surface 1a of the apparatus case 1 so that the outer plate section 16a of the loading section 16 in the tray member 15 projects from the rear surface 1a of the apparatus case 1, as shown in FIG. 4 and FIG. 5.

Here, the plurality of guide members 18 provided on the lower surface of the apparatus case 1 respectively guide the plurality of guide holes 20 provided in the loading section 16. As a result, the tray member 15 is smoothly pulled outward.

More specifically, here, the threaded shafts 18b of the plurality of guide members 18 are relatively moved in the plurality of guide holes 20 with the head sections 18a of the plurality of guide members 18 being arranged within the plurality of guide concave sections 21 and the edges of the plurality of guide holes 20 being pressed against the lower surface of the apparatus case 1.

As a result, the tray member 15 is smoothly pulled outward with no backlash.

Then, the written announcement 14 is arranged on the outer plate section 16a of the loading section 16 of the tray member 15 pulled out of the rear surface 1a of the apparatus case 1 and, in this state, the pressing section 17 of the tray member 15 is pressed toward the rear surface 1a of the apparatus case 1.

As a result, the lower portion of the written announcement 14 is held between the pressing section 17 of the tray member 15 and the rear surface 1a of the apparatus case 1, whereby the written announcement 14 is arranged with it being leaned against the rear surface 1a of the apparatus case 1.

Here, in a case where the written announcement 14 is larger than the rear surface 1a of the apparatus case 1, the written announcement 14 may be arranged on the tray member 15 while being shifted toward the side opposite to the auxiliary display device 4 so as not to cover the display section 11 in the auxiliary display device 4.

In this case, even if the written announcement 14 is arranged while projecting upward from the apparatus case 1, when the inclination of the input display unit 2 is to be adjusted, the written announcement 14 does not interfere with the adjustment.

More specifically, a rear surface portion of the unit case 5 of the input display unit 2 does not project backward from the rear surface 1a of the apparatus case 1 when the unit case 5 is rotated around the hinge mechanism 7.

Therefore, the rear surface portion of the unit case 5 does not come in contact with the written announcement 14 when the unit case 5 is rotated in the vertical direction, so that the unit case 5 can be rotated in the vertical direction.

As a result, the written announcement 14 is not affected by the unit case 5, whereby a state where the written announcement 14 is arranged on the rear surface 1a of the apparatus case 1 can be favorably maintained.

Also, when the tray member 15 is to be removed from the apparatus case 1, it is pulled outward to the maximum.

Here, the threaded shafts 18b of the plurality of guide members 18 positioned on the front side of the apparatus case 1, i.e., the side opposite to the rear surface 1a of the apparatus case 1 are elastically held by the plurality of elastic holding sections 23 provided on the attachment/detachment holes 22a side of the plurality of guide holes 20 on the front side of the apparatus case 1.

Accordingly, resistance force against the pulling operation of the tray member 15 is increased.

In this state, when the tray member 15 is further pulled outward, the threaded shafts 18b of the plurality of guide members 18 come in contact with the click sections 24 provided in crossing portions between the attachment/detachment holes 22a of the plurality of guide holes 20 and the plurality of guide holes 20.

Accordingly, the pulling force of the tray member 15 becomes heavier. In this state, when the tray member 15 is further pulled outward, the threaded shafts 18b of the plurality of guide members 18 elastically deform the click sections 24 to move across the click sections 24.

As a result, a click feeling is given to the tray member 15.

Here, when the click feeling is given to the tray member 15, the operator knows that the threaded shafts 18b of the plurality of guide members 18 have been fitted into the attachment/detachment holes 22a of the plurality of guide holes 20.

When the plurality of guide members 18 are arranged within the attachment/detachment holes 22a of the plurality of guide holes 20, the head sections 18a of the plurality of guide members 18 can be detached through the attachment/detachment holes 22a of the plurality of guide holes 20, whereby the tray member 15 can be removed from the lower surface of the apparatus case 1.

As described above, this electronic register enables the written announcement 14 to be easily posted by including the apparatus case 1 which is provided with the input display unit 2 serving as an operation section and the tray member 15 which is provided to be slidable from the apparatus case 1 and retractably projects from the rear surface 1a of the apparatus case 1 positioned on the side opposite to the operation side of the input display unit 2 so that the written announcement 14 can be posted. As a result, customers can be easily and favorably informed of information such as an advertisement or a notice.

In this embodiment, the input display unit 2 includes the unit case 5 and the input display panel 6 provided thereon, and is structured such that an operator inputs information regarding a commodity purchased by a customer by performing a touch operation on the input display panel 6. As a result of this configuration, the operator can input information regarding a commodity purchased by a customer by performing a touch operation on the input display panel 6 while seeing the information displayed on the input display panel 6, and can display the input information on the input display panel 6.

Also, the input display unit 2 is mounted on the apparatus case 1 in a manner to be rotatable in the vertical direction by the hinge mechanism 7. Accordingly, the inclination of the input display unit 2 with respect to the apparatus case 1 can be adjusted by the input display unit 2 being rotated in the vertical direction by the hinge mechanism 7. As a result of this structure, the input display panel 6 can be easily operated by the operator and information displayed on the input display panel 6 can be easily seen.

More specifically, the hinge mechanism 7 includes the rotation section 8a which is provided projecting in a semicircular shape on the lower surface of the unit case 5 and the support section 8b which is provided concavely in a semicircular shape on the apparatus case 1 and on which the rotation section 8a on the unit case 5 is rotatably arranged. Accordingly, the semicircular-shaped rotation sections 8a in the hinge mechanism 7 can be favorably rotated while being supported by the semicircular-shaped support section 8b in the hinge mechanism 7, whereby the inclination of the input display unit 2 with respect to the apparatus case 1 can be easily and favorably adjusted.

In this embodiment, even if the written announcement 14 is larger than the rear surface 1a of the apparatus case 1 and arranged projecting upward from the apparatus case 1, the rear surface portion of the unit case 5 does not project backward from the rear surface 1a of the apparatus case 1 when the inclination of the input display unit 2 is adjusted.

Therefore, the rear surface portion of the unit case 5 does not come in contact with the written announcement 14 when the unit case 5 is rotated in the vertical direction, so that the unit case 1 does not interfere with the rotation. As a result a state where the written announcement 14 is arranged on the rear surface 1a of the apparatus case 1 can be favorably maintained.

Also, in this electronic register, the tray member 15 includes the loading section 16 arranged under the lower surface of the apparatus case 1 and the pressing section 17 separably corresponding to the rear surface 1a of the apparatus case 1, and the loading section 16 is slidably mounted by the plurality of guide members 18 provided on the lower surface of the apparatus case 1. Therefore, the tray member 15 can be smoothly and favorably slid.

More specifically, in the tray member 15, the loading section 16 is provided with the plurality of guide holes 20 which are slidably guided by the plurality of guide members 18 along the longitudinal direction of the apparatus case 1. Accordingly, the plurality of guide holes 20 can be guided by the plurality of guide members 18 when the tray member 15 is slid in the longitudinal direction of the apparatus case 1, whereby the tray member 15 can be smoothly and reliably slid.

In this embodiment, each of the plurality of guide holes 20 has the guide concave section 21 provided at a hole edge on its lower surface along the sliding direction. In addition, each of the plurality of guide members 18 includes the head section 18a slidably arranged within the guide concave section 21 and the threaded shaft 18b fixed to the lower surface of the apparatus case 1 via the guide hole 20. Accordingly, the guide concave section 21 can be guided by the head section 18a, and the guide hole 20 can be guided by the threaded shaft 18b, whereby the tray member 15 can be smoothly slid.

More specifically, in each of the plurality of guide members 18, the head section 18a is arranged within the guide concave section 21 without projecting downward from the tray member 15, and presses the edge of the guide hole 20 against the lower surface of the apparatus case 1.

Accordingly, when being slid, the tray member 15 can be smoothly slid with no backlash and without dropping off the lower surface of the apparatus case 1.

Also, in the tray member 15, the attachment/detachment holes 22a and 22b through which the head sections 18a of the plurality of guide members 18 are removably inserted are provided in the plurality of guide holes 20 while vertically penetrating therethrough. Therefore, the head sections 18a of the plurality of guide members 18 can be detached through the attachment/detachment holes 22a and 22b of the plurality of guide holes 20 by being set corresponding thereto, whereby the tray member 15 can be easily removed from the lower surface of the apparatus case 1 without using a tool.

More specifically, two of the plurality of attachment/detachment holes 22a and 22b are provided at the front ends of the plurality of guide holes 20 on the front side of the apparatus case 1, and the other two attachment/detachment holes 22b are respectively provided in substantially intermediate portions of the corresponding guide holes 20 in the longitudinal direction. In addition, the distance of the attachment/detachment hole 22b from the attachment/detachment hole 22a positioned at the front end of each of the guide holes 20 is set to be the same as the distance between the guide members 18 in the longitudinal direction. Therefore, the head sections 18a of the plurality of guide members 18 can correspond to the attachment/detachment holes 22a and 22b of the plurality of guide holes 20.

As a result, when the tray member 15 is most pulled out of the rear surface 1a of the apparatus case 1, the head sections 18a of the plurality of guide members 18 are respectively arranged within the attachment/detachment holes 22a and 22b of the plurality of guide holes 20, and detached through the attachment/detachment holes 22a and 22b from the plurality of guide holes 20. Therefore, the tray member 15 can be easily removed.

Moreover, in the tray member 15, the plurality of guide holes 20 are respectively provided with the elastic holding sections 23 which elastically and slidably hold the plurality of guide members 18 when the plurality of guide members 18 come close to the plurality of attachment/detachment holes 22a and 22b. As a result of this structure, when the tray member 15 is slid, the elastic holding sections 23 elastically hold the guide members 18, so that resistance force against the sliding operation of the tray member 15 is increased and the tray member 15 is not slid more than necessary.

In this embodiment, the elastic holding sections 23 have the slit holes 23a provided opposing each other in the guide concave sections 21 positioned on both sides thereof in the direction perpendicular to the longitudinal direction of the plurality of guide holes 20. Therefore, the opposing edges of the guide hole 20 positioned between the slit holes 23 can be respectively elastically deformed toward the slit holes 23a. As a result, the elastic holding sections 23 can reliably and favorably hold the threaded shaft 18b of the guide member 18 elastically.

Also, the elastic holding sections 23 are provided such that they are directed toward the pressing section 17 of the tray member 15 from both sides of each of the two attachment/detachment holes 22a positioned at the inner ends (left ends in FIG. 7A) of the guide holes 20 in the longitudinal direction. Accordingly, when the tray member 15 is to be pulled outward to the maximum so as to be removed from the apparatus case 1, the threaded shafts 18b of the guide members 18 positioned on the front side of the apparatus case 1 are elastically held by the elastic holding sections 23, whereby resistance force against the pulling operation of the tray member 15 is increased, and the guide members 18 can be prevented from being unnecessarily fitted into the attachment/detachment holes 22a positioned on the front side of the apparatus case 1.

Furthermore, the two attachment/detachment holes 22a positioned at the front ends of the guide holes 20 positioned on the front side of the apparatus case 1 among the plurality of guide holes 20 are respectively provided with the click sections 24 which give a click feeling to the tray member 15 when the plurality of guide members 18 reach the attachment/detachment holes 22a and 22b. As a result, when the threaded shafts 18b of the guide members 18 reach the attachment/detachment holes 22a and 22b, a click feeling can be given to the tray member 15. Accordingly, it can be judged that the threaded shafts lab of the guide members 18 have been fitted into the attachment/detachment holes 22a, whereby the tray member 15 can be easily removed.

More specifically, the click sections 24 are elastic projections provided to project in a direction in which they come closer to each other in areas where the guide holes 20 and the attachment/detachment holes 22 cross each other. These click sections 24 elastically deform when the threaded shafts 18b of the guide members 18 reach the attachment/detachment holes 22a, and elastically return when the threaded shafts 18b of the guide members 18 are fitted into the attachment/detachment holes 22a, whereby a click feeling can be reliably and favorably given to the tray member 15. As a result, it can be favorably judged that the threaded shafts 18b of the guide members 18 have been fitted into the attachment/detachment holes 22a.

While the present invention has been described with reference to the preferred embodiments it is intended that the invention be not limited by any of the details of the description therein but includes all the embodiments which fall within the scope of the appended claims.

What is claimed is:
1. An electronic apparatus comprising:
an apparatus body which is provided with an operation section; and
a tray member which is slidably provided on the apparatus body and projects from a rear surface of the apparatus body on a side opposite to an operation side of the operation section so that a written announcement can be posted, wherein:

the tray member includes a loading section which is arranged under a lower surface of the apparatus body, and a pressing section which separably corresponds to the rear surface of the apparatus body, the loading section is provided to be slidable by a plurality of guide members provided on the lower surface of the apparatus body, the loading section has a plurality of guide holes which are provided along a longitudinal direction of the apparatus body and slidably guided by the plurality of guide members, and each guide hole has a guide concave section which is provided at a hole edge on a lower surface thereof along a sliding direction, and each guide member includes a head section which is slidably arranged within the guide concave section and a shaft section which is fixed to the lower surface of the apparatus body via the guide hole.

2. The electronic apparatus according to claim 1, wherein the operation section is an input display section.

3. The electronic apparatus according to claim 1, wherein the operation section is mounted on the apparatus body in a manner to be rotatable in a vertical direction by a hinge mechanism.

4. The electronic apparatus according to claim 1, wherein an attachment/detachment hole through which the head section of the guide member is removably inserted is provided penetrating vertically in a predetermined area of each guide hole.

5. The electronic apparatus according to claim 4, wherein each guide hole is provided with a click section which gives a click feeling to the tray member when the guide member reaches the attachment/detachment hole.

6. The electronic apparatus according to claim 1, wherein each guide hole is provided with an elastic holding section which elastically and slidably holds a guide member when the guide member comes close to the attachment/detachment hole.

7. An electronic register comprising:

an apparatus body provided with an operation section which is operated by an operator to input information regarding a commodity whose sales are registered;

a display which is provided in an area different from an area where the operation section is provided, and displays the information regarding the commodity to a customer; and a tray member which is slidably provided on the apparatus body and projects from a rear surface of the apparatus body on a side opposite to an operation side of the operation section so that a written announcement can be posted, wherein:

the tray member includes a loading section which is arranged under a lower surface of the apparatus body, and a pressing section which separably corresponds to the rear surface of the apparatus body, the loading section is provided to be slidable by a plurality of guide members provided on the lower surface of the apparatus body, the loading section has a plurality of guide holes which are provided along a longitudinal direction of the apparatus body and slidably guided by the plurality of guide members, and each guide hole has a guide concave section which is provided at a hole edge on a lower surface thereof along a sliding direction, and each guide member includes a head section which is slidably arranged within the guide concave section and a shaft section which is fixed to the lower surface of the apparatus body via the guide hole.

8. The electronic register according to claim 7, wherein the operation section is an input display section including an input section which is operated by the operator to input the information regarding the commodity and a display section which displays the information regarding the commodity.

9. The electronic register according to claim 7, wherein the operation section is mounted on the apparatus body in a manner to be rotatable in a vertical direction by a hinge mechanism.

10. The electronic register according to claim 7, wherein an attachment/detachment hole through which the head section of the guide member is removably inserted is provided penetrating vertically in a predetermined area of each guide hole.

11. The electronic register according to claim 10, wherein each guide hole is provided with a click section which gives a click feeling to the tray member when the guide member reaches the attachment/detachment hole.

12. The electronic register according to claim 7, wherein each guide hole is provided with an elastic holding section which elastically and slidably holds a guide member when the guide member comes close to the attachment/detachment hole.

* * * * *